(12) United States Patent
Wu et al.

(10) Patent No.: US 10,931,856 B2
(45) Date of Patent: Feb. 23, 2021

(54) ELECTRONIC DEVICE

(71) Applicant: BEIJING XIAOMI MOBILE SOFTWARE CO., LTD., Beijing (CN)

(72) Inventors: Ning Wu, Beijing (CN); Boyuan Wang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/551,957

(22) Filed: Aug. 27, 2019

(65) Prior Publication Data
US 2020/0076992 A1 Mar. 5, 2020

(30) Foreign Application Priority Data
Aug. 30, 2018 (CN) .................. 201811004470.X

(51) Int. Cl.
| | | |
|---|---|---|
| *H04N 5/225* | (2006.01) | |
| *H04M 1/02* | (2006.01) | |
| *H04N 5/232* | (2006.01) | |
| *H02P 29/40* | (2016.01) | |
| *H04N 7/14* | (2006.01) | |

(52) U.S. Cl.
CPC ........... *H04N 5/2252* (2013.01); *H02P 29/40* (2016.02); *H04M 1/0264* (2013.01); *H04N 5/2259* (2013.01); *H04N 5/232* (2013.01); *H04N 7/142* (2013.01); *H04N 2007/145* (2013.01)

(58) Field of Classification Search
CPC .... H04N 5/2252; H04N 5/2259; H04N 5/232; H04N 7/142; H04N 2007/145; H04N 5/2257; H04M 1/0264; H04M 2250/20; H04M 1/03; H04M 1/0227; H04M 1/0225; H04M 1/026; H04M 2250/12; H04M 2250/22; H02P 29/40; G06F 1/16
See application file for complete search history.

(56) References Cited

U.S. PATENT DOCUMENTS

| | | | |
|---|---|---|---|
| 2005/0195322 A1* | 9/2005 | Park ............... | H04M 1/0264 348/373 |
| 2009/0237872 A1* | 9/2009 | Bemelmans ....... | G06F 1/1601 361/679.01 |
| 2017/0064161 A1* | 3/2017 | Buss ............... | H04N 5/2252 |

FOREIGN PATENT DOCUMENTS

| | | | |
|---|---|---|---|
| CN | 207491003 U | * | 6/2018 |
| CN | 207491003 U | | 6/2018 |
| EP | 1571807 A1 | | 9/2005 |
| EP | 3525424 A1 | | 8/2019 |
| JP | 2009049586 A | | 3/2009 |
| KR | 1020060018479 A | | 3/2006 |

OTHER PUBLICATIONS

European Patent Office, Extended European Search Report Issued in Application No. 19194483.4, dated Oct. 11, 2019, Germany, 12 pages.

* cited by examiner

*Primary Examiner* — Yogesh K Aggarwal
(74) *Attorney, Agent, or Firm* — Syncoda LLC; Feng Ma

(57) ABSTRACT

An electronic device includes an device body, where an opening is formed on the surface of the device body and a rotating shaft is provided within the device body; and a functional module rotatable around the rotating shaft, where the functional module is configured to be able to rotate into the device body or rotate out from the device body through the opening.

20 Claims, 7 Drawing Sheets

ELECTRONIC DEVICE

CROSS REFERENCE TO RELATED APPLICATIONS

This application claims priority to Chinese Patent Application No. 201811004470.X filed on Aug. 30, 2018, the entire content of which is incorporated herein by reference.

BACKGROUND

An electronic device such as a mobile phone or a tablet computer typically includes a variety of functional components, and different functional components have respective requirements. For example, some functional components, such as a camera, a flash lamp and so on, may need to interact with an outside environment. For example, the camera and the flash lamp may need to be adjusted properly according to external light received by a sensor, so that the functional components may realize their respective functions.

SUMMARY

According to an aspect of the present disclosure, an electronic device is provided, which includes:

a device body, where an opening is formed in a surface of the device body, and a rotating shaft is provided within the device body; and a functional module rotatable around the rotating shaft, where the functional module is configured to be able to rotate into the device body or rotate out from the device body through the opening.

It shall be appreciated that the above general descriptions and the following detailed descriptions are merely illustrative and explanatory and cannot limit the present disclosure.

It should be understood that both the foregoing general description and the following detailed description are exemplary and explanatory only and are not restrictive of the disclosure. Other aspects and embodiments of the present disclosure will become clear to those of ordinary skill in the art in view of the following description and the attached drawings.

BRIEF DESCRIPTION OF DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

The term used in the present disclosure is for the purpose of describing particular examples only and is not intended to limit the present disclosure. As used in this disclosure and the appended claims, the singular forms "a", "an" and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first", "second", "third", and the like may be used herein to describe various information, the information should not be limited by these terms. These terms are only used to distinguish one category of information from another. For example, without departing from the scope of the present disclosure, first information may be referred as second information; and similarly, second information may also be referred as first information. As used herein, the term "if" may be interpreted as "when" or "upon" or "in response to determining" depending on the context.

Figure 1:
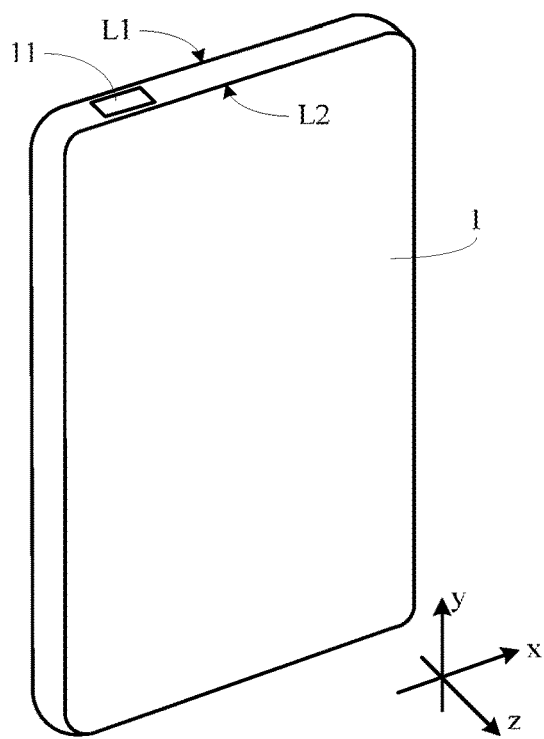
FIG. 1 illustrates a schematic perspective view of a structure of an electronic device according to some embodiments.

Various embodiments of the present disclosure provide an electronic device. As shown in FIG. 1, a surface of the device body 1 of the electronic device is provided with an opening 11, where the opening 11 may be located at a surface of a top of the device body 1. The electronic device further includes a functional module 2, where the functional module 2 may include a camera 21.

The various device components, blocks, or portions may have modular configurations, or are composed of discrete components, but nonetheless may be referred to as "modules" in general. In other words, the "modules" referred to herein may or may not be in modular forms.

Figure 2:
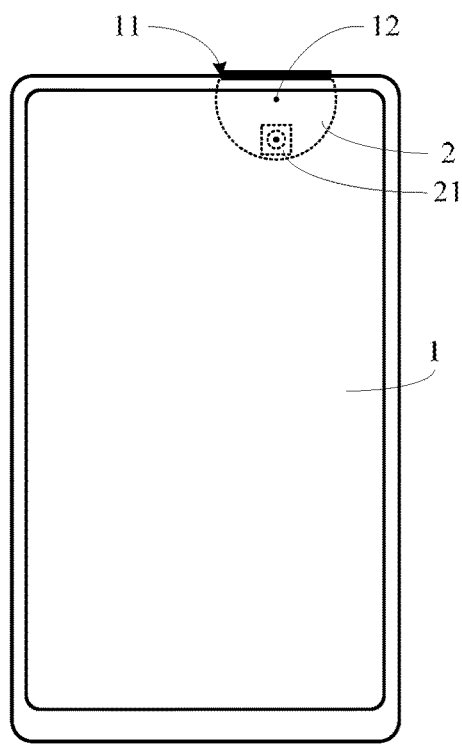
FIG. 2 illustrates a schematic diagram of the electronic device shown in FIG. 1 when the functional module is in a rotate-in state.

In the state shown in FIGS. 1-2, the functional module 2 may rotates into the device body 1 through the opening 11, so that the camera 21 is hidden into the device body 1. It is noted that for the convenience of viewing, the area of the opening 11 is schematically thickened in FIGS. 2-5, which does not mean that the actual scene must be shown like FIGS. 2-5.

Further, the functional module 2 is rotatable around a rotating shaft 12 within the device body 1, so that at least one part of the functional module 2 may be rotated out from the device body 1 through the opening 11. For example, in the state shown in FIG. 3, the camera 21 may be rotates out from the device body 1 to perform shooting.

In some embodiments, the camera 21 includes a front camera (e.g., a front camera component) or a rear camera (e.g., a rear camera component). Of course, in addition to the camera 21, the functional module 2 may further include: a flash lamp component, a 3-dimensions (3D) structured light component, an earpiece component, a speaker component, and the like, which is not limited in the present disclosure.

In some embodiments, the functional module 2 is cooperated with the opening 11, so that when the functional module 2 rotates into the device body 1 through the opening 11, the functional module 2 is flush with the surface of the device body 1 in which the opening 11 is provided, thereby avoiding destroying the integrity of the electronic device, that is, in this case, the surface of the electronic device provided with the opening 11 is flat.

As shown in FIG. 2, when the functional module 2 rotates into the device body 1 through the opening 11, the surface of the device body 1 in which the opening 11 is provided is flush with the surface of the functional module 2. In this way, the surface of the device body 1 in which the opening 11 is provided is an entirety visually. The surface of the device body 1 in which the opening 11 is provided and the surface of the functional module 2 may form a uniform decorative layer, so that a better unified visual effect is obtained.

In some embodiments, after the functional module 2 is rotated into the device body 1 through the opening 11, the functional module 2 and the surface on the device body 1 in which the opening 11 is provided may be not flush, which may be caused by process reasons or special structural designs. For example, the functional module 2 slightly protrudes from or is slightly recessed in the device body 1, so that the user may quickly position the functional module 2 by looking or touching.

In some embodiments, the opening 11 avoids ridge lines of the device body 1, so as to avoid destroying the structural strength of the device body 1. For example, in the example shown in FIG. 1, when the opening 11 is located at the surface of the top of the device body 1, the ridge lines associated with the surface of the top include: the ridge line L1 and the ridge line L2, and the opening 11 may be located between the ridge line L1 and the ridge line L2, so as to avoid destroying (e.g., cutting) the ridge line L1 or the ridge line L2. In this way, the structural strength of the device body 1 is not affected. Similarly, when the opening 11 is located on the other surface (e.g., a surface of the bottom, a surface of the left, a surface of the right, or the like) of the device body 1 or on a backplate of the electronic device, the structural strength of the device body 1 is not affected by avoiding ridge lines.

In some embodiments, the functional module 2 is rotatable around the rotating shaft 12. The rotating shaft 12 may extend along a thickness direction of the electronic device, such as the front-back direction. In the examples shown in FIGS. 1-3, the front-back direction may be a z-axis direction, so that the functional module 2 may rotate into or out from the device body 1.

Figure 3:
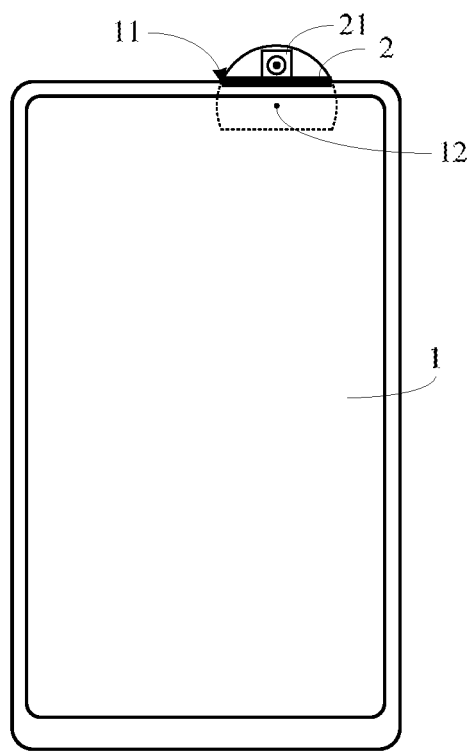
FIG. 3 illustrates a schematic diagram of the electronic device shown in FIG. 1 when the functional module is in a rotate-out state.

In some embodiments, the functional module 2 is freely rotatable about the rotating shaft 12. As shown in FIGS. 2-3, a projection of the functional module 2 in the z-axis direction is a part of a circle, and the rotating shaft 12 is located at a center of the circle, so that the functional module 2 may rotate around the rotating shaft 12 by 360 degrees without interfering with an edge of the opening 11. Therefore, the functional module 2 may rotate clockwise (or counterclockwise) by 180 degrees from a rotate-in state shown in FIG. 2 to a rotate-out state shown in FIG. 3, and then further rotate clockwise (or counterclockwise) by 180 degrees to return to the rotate-in state shown in FIG. 2.

In some embodiments, even if the functional module 2 is rotatable freely, the rotating angle of the functional module 2 may still be limited according to some actual requirements. For example, the functional module 2 rotates clockwise (or counterclockwise) by 180 degrees from the rotate-in state shown in FIG. 2 to the rotate-out state shown in FIG. 3, and then further rotates counterclockwise (or clockwise) by 180 degrees to return to the rotate-in state shown in FIG. 2.

In some embodiments, although the functional module 2 is rotatable by 180 degrees or 360 degrees in the same direction, based on the installation position of the camera 21 or other functional components on the functional module 2, if only a rotation of 90 degrees of the functional module 2 may realize the related functions, the functional module 2 is only rotatable by 90 degrees; and if it is possible to realize the related functions with a rotation of 60 degrees, the functional module 2 is only rotatable by 60 degrees.

Figure 4:
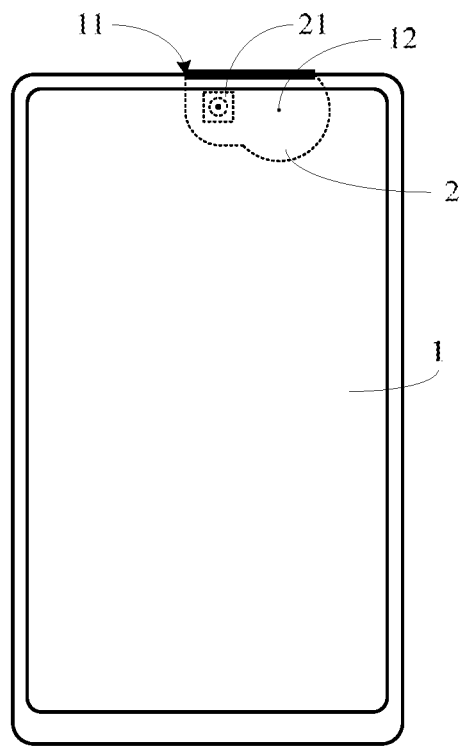
FIG. 4 illustrates a schematic structural diagram of an electronic device in which a functional module is in a rotate-in state according to some embodiments.
Figure 5:
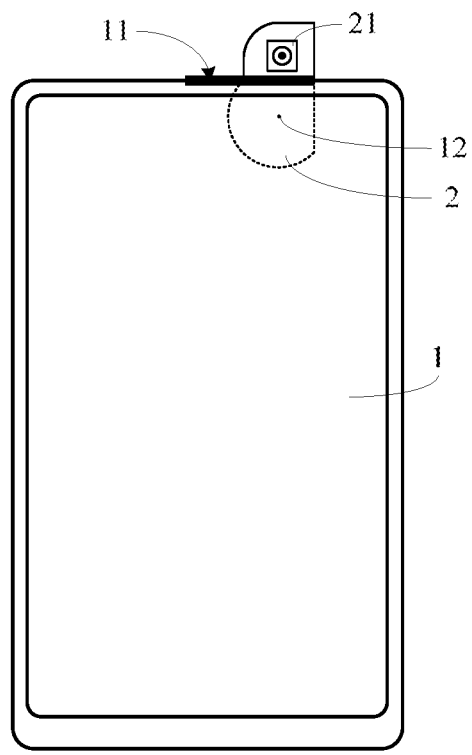
FIG. 5 illustrates a schematic structural diagram of the electronic device shown in FIG. 4 when the functional module is in the rotated-out state.

In some embodiments, after the functional module 2 rotates out from the device body 1, the functional module 2 may be interfered with the edge of the opening 11, so as to limit the position the functional module 2 at a target position. For example, as shown in FIGS. 4-5, the projection of the functional module 2 in the z-axis direction includes two areas: the right area is a part of a circle and the rotating shaft 12 is located at the center of the circle, and the left area is out of the circle. That is, the left area exceeds the coverage area of the circle. In this case, the functional module 2 may rotate clockwise by 90 degrees from the rotate-in state shown in FIG. 4 to the rotate-out state shown in FIG. 5, and then rotate counterclockwise by 90 degrees to return to the rotate-in state shown in FIG. 4.

By adjusting the radius of the circle for the right area of the functional module 2, the shape and the specification of the left area, the relative position relationship between the rotating shaft 12 and the opening 11, and the like, the interference between the functional module 2 and the opening 11 is generated after the functional module 2 rotates by a particular angle, such as, 90 degrees or 180 degrees, or the interference between the functional module 2 and other structures in the device body 1 may be generated. That is, the interference between the functional module 2 and other structures on the device body 1 in addition to the opening 11 is possible, which is not limited in the present disclosure.

In some embodiments, the user may manually rotate the functional module 2, so that the functional module 2 rotates around the rotating shaft 12. For example, the user may apply the downward pressure on a surface of the functional module 2 at the opening 11, so that the functional module 2 may rotate around the rotating shaft 12 to rotate into or out from the device body 1.

Figure 6:
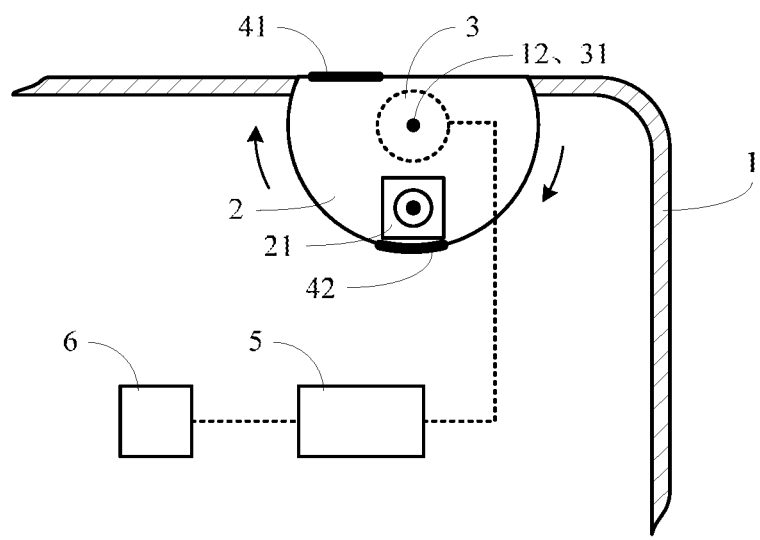
FIG. 6 illustrates a partial structural schematic diagram of an electronic device illustrating a control of the rotation of the function module according to some embodiments.
Figure 7:
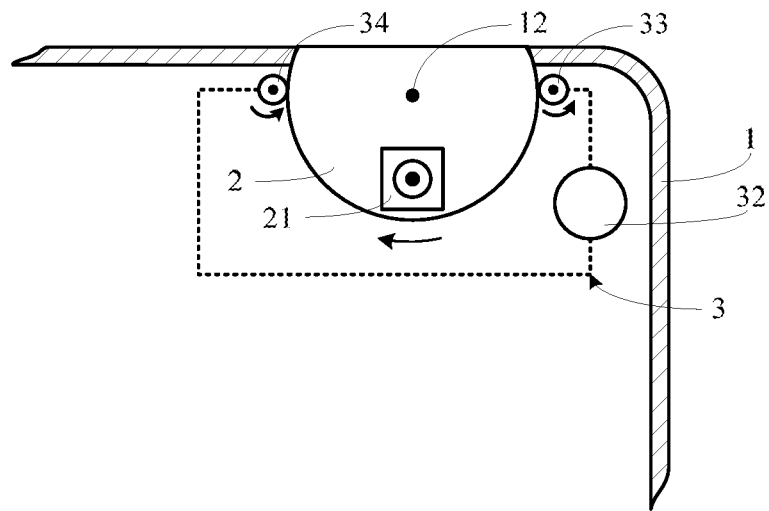
FIG. 7 illustrates a partial structural schematic diagram of an electronic device illustrating another control of the rotation of the function module according to some embodiments.

In some embodiments, the functional module 2 automatically rotates without applying an external force by the user. As shown in FIGS. 6-7, the electronic device may include a driving module 3 for driving the functional module 2 to rotate, so that the functional module 2 may rotate into or out from the device body 1. For example, the driving module 3 may include a stepping motor and components associated with the stepping motor. The driving module 3 may control the rotating speed and rotating angle of the functional module 2 by the frequency and number of pulses of the pulse signal. Other types of driving modules 3 may be applied in the electronic device of the present disclosure, and the present disclosure is not limited thereto.

In some embodiments, as shown in FIG. 6, the functional module 2 rotates around the rotating shaft 12, which may be a driving shaft 31 formed by the driving module 3. Taking a stepping motor and the components associated with the stepping motor as an example, the driving shaft 31 may be directly driven by the stepping motor, or the driving shaft 31 may be driven by a transmission mechanism that cooperates with the stepping motor.

In some embodiments, as shown in FIG. 7, the functional module 2 rotates around the rotating shaft 12, the rotating shaft 12 may be a fixed shaft, and the driving module 3 is used for driving the functional module 2 to rotate around the fixed shaft. For example, the driving module 3 includes a stepping motor 32, a gear 33, a gear 34, and the like, and a surface of the functional module 2 may be gear-shaped to fit the gears 33, 34. Therefore, when the gear 33 and the gear 34 are driven to rotate by the stepping motor 32, the gears 33, 34 may drive the functional module 2 to rotate.

In some embodiments, the electronic device may include a trigger detection module for detecting a trigger operation of the user, so that the driving module 3 drives the functional module 2 to rotate when it is determined that the trigger detection module detects the trigger operation from the user.

For example, as shown in FIG. 6, in a state where the functional module 2 rotates into the device body 1, a surface of the functional module 2 at the opening 11 is provided with a first touch sensing component 41. When the user desires to take a picture with the camera 21, the first touch sensing component 41 may be touched, and the driving module 3 may drive the functional module 2 to rotate in response to the touch operation, so that the functional module 2 rotates out from the device body 1. A second touch sensing component 42 may be provided on another surface of the functional module 2 opposite to the first touch sensing component 41.

In a situation that the functional module 2 rotates out from the device body 1, the second touch sensing component 42 may rotates to the opening 11, so that the user may touch the second touch sensing component 42. When the user touches the second touch sensing component 42, the driving module 3 may drive the functional module 2 to rotate in response to the touch operation, so that the functional module 2 rotates into the device body 1.

In addition to touch sensing components 41, 42, sensing components such as pressure sensing components may also be used, and the present disclosure is not limited thereto. In another example, in addition to a case that the trigger detection module is provided on the functional module 2, the trigger detection module may also be provided in the device body 1, for example, the trigger detection module may include a physical button or a touch component in the device body 1, and the disclosure is not limited thereto. In some embodiments, if the functional module 2 includes the camera 21, the trigger detection module includes a photo button as the physical button.

In some embodiments, the electronic device may include a control module. The control module may send a rotate-in command or a rotate-out command to the driving module 3 in response to a turn-off command or a call command for the functional module 2, so as to instruct the driving module 3 to drive the functional module 2 to rotate into or out from the device body 1.

As shown in FIG. 6, the control module may include a central processing unit 5 (CPU 5) provided within the device body 1, and the CPU 5 may receive a turn-off command or a call command from an application executed by the electronic device. For example, when the user clicks a photographing application in the electronic device, the application may send a call command for using the functional module 2 to the CPU 5, or the CPU 5 may automatically generate the call command in a case that the application pre-registers the requirement for using the functional module 2, so that the CPU 5 sends the rotate-out command to the driving module 3.

The rotate-out command is used to instruct the driving module 3 to drive the functional module 2 to rotate out from the device body 1. In this way, the application may use the camera 21 to take a photo. When the user turns off the photographing application, the application may send a turn-off command for the functional module 2 to the CPU 5, or the CPU 5 may automatically generate the turn-off command based on the state monitoring for the application, so that the CPU 5 sends the rotate-in command to the driving module 3. The rotate-in command is used to instruct the driving module 3 to drive the functional module 2 to rotate into the device body 1.

In addition to rotate-in or rotate-out the functional module 2 by the employing the application, the user may also use other manners to rotate-in or rotate-out the functional module 2. In some embodiments, the user sends a voice command, such as turn off the camera, turn on the camera, or the like, to the electronic device, or the uses may perform an operation, such as, shake, on the electronic device, so that the CPU 5 sends a turn-off command or a call command for the functional module 2. The present disclosure does not limit how to send a turn-off command or a call command for the functional module 2.

In some embodiments, the electronic device includes a fall detection module configured to detect whether the device body 1 is in a fall state, so that the driving module 3 drives the functional module 2 to rotate into the device body 1 when it is determined that the device body 1 is in the fall state.

For example, as shown in FIG. 6, the fall detection module may include a gravity sensor 6 within the device body 1. The gravity sensor 6 is configured to detect acceleration data of the device body 1 and determine whether the device body 1 is in the fall state according to the acceleration data, or the gravity sensor 6 may transmit the detected acceleration data to the CPU 5, and the CPU 5 may determine whether the device body 1 is in the fall state. When it is determined that the device body 1 is in the fall state, the CPU 5 may send a rotate-in command to the driving module 3, so that the driving module 3 may control the functional module 2 which has rotated out from the device body 1 to rotate into the device body 1, thereby avoiding the functional module 2 being damaged after falling.

Although the above examples have been described with reference to FIG. 6, the trigger detection module, the control module, the fall detection module, and the like provided by the present disclosure may be applied to examples shown in FIG. 7 or other structures provided by the present disclosure, and the present disclosure is not limited thereto.

In the examples shown in FIGS. 2-7, the functional module 2 can include the camera 21. The camera 21 may be used as a front camera of the electronic device when the camera 21 turns towards the front panel (display) side of the electronic device. The camera 21 may be used as a rear camera of the electronic device when the camera 21 turns towards the backplate side of the electronic device.

Figure 8:
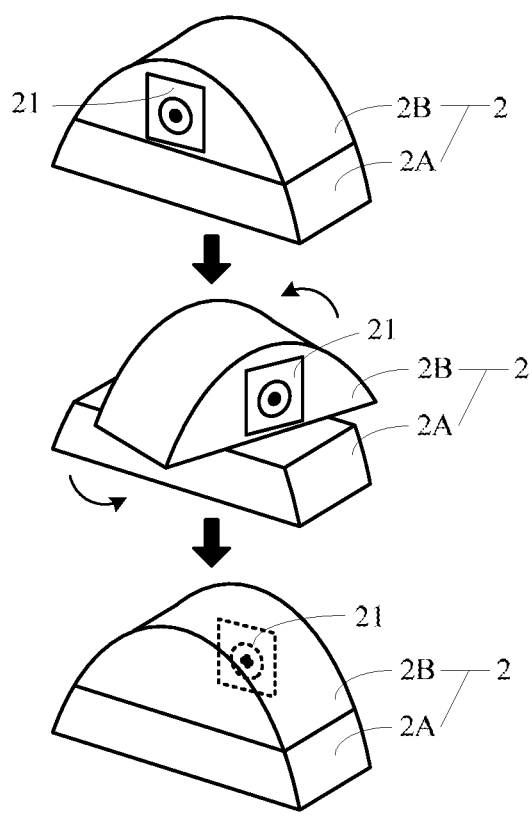
FIG. 8 illustrates a schematic structural diagram of a functional module being controlled to rotate according to some embodiments.

As shown in FIG. 8, the functional module 2 includes a fixed portion 2A and a rotating portion 2B, and the camera 21 is in the rotating portion 2B. Assume that the top figure in FIG. 8 shows a default state of the functional module 2, for example, the camera 21 is towards the front panel side of the electronic device and in this case, the camera 21 is used as the front camera of the electronic device. When the user triggers a mode switching option in the application, in an example, the driving module 3 may drive the rotating portion 2B to rotate counterclockwise (clockwise in other examples) as shown in the middle figure of FIG. 8, so that the camera 21 is rotated from the front panel side to the backplate side.

When the camera 21 is rotated towards the backplate side, the position of the camera 21 is shown in the down figure of FIG. 8. In this case, the camera 21 is used as the rear camera of the electronic device. Therefore, the requirements of front and rear shooting by the user may be met with the camera 21, without two or more cameras in the electronic device. In this way, the internal space of the device body 1 occupied by the camera 21 can be reduced. Further, when the opening 11 is in the surface of the device body 11 as shown in FIGS. 1-7, it is avoided that the front panel and backplate of the device body 1 are provided with an opening, so as to enhance the integrity and beauty of the device body 1.

In addition, in addition to the case that the camera 21 is towards the front panel side and the backplate side, the rotating portion 2B and the fixed portion 2A may form an arbitrary angle, so that the camera 21 realizes other orientations than "towards front" and "towards rear", such as towards left, towards right, towards left front, towards left rear, towards right front, towards right rear, and the like, and the present disclosure does not limit the orientation of the camera 21.

In addition to the rotation of the rotating portion 2B driven by the driving module 3, the rotating portion 2B may be rotated by an external force applied by the user. That is, the user may manually rotate the rotating portion 2B to adjust the camera 21 to a desired direction or angle.

Figure 9:
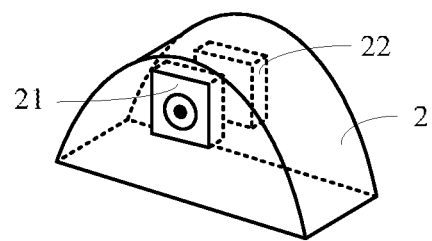
FIG. 9 illustrates a schematic structural diagram of a functional module having multiple functional components according to some embodiments.

FIG. 9 illustrates a schematic structural diagram of a functional module with a plurality of functional components according to some embodiments. As shown in FIG. 9, the functional module 2 includes two functional components, such as, the camera 21 and the camera 22, the camera 21 and the camera 22 may be overlapped along the extending direction of the rotating shaft 12 (e.g., z-axis direction), and when the functional module 2 rotates around the rotating shaft 12, the camera 21 and the camera 22 correspond to the same rotating angle. In some embodiments, as shown in FIG. 2, both the camera 21 and the camera 22 may be completely rotated out from the device body 1 when the functional module 2 rotates by 180 degrees. In another example, as shown in FIG. 4, both the camera 21 and the camera 22 may be completely rotated out from the device body 1 when the functional module 2 rotates by 90 degrees.

By overlapping the camera 21 and the camera 22 in the manner shown in FIG. 9, when the camera 21 is towards the front panel side of the electronic device, the camera 22 is towards the backplate side of the electronic device, so that the camera 21 is used as the front camera of the electronic device and the camera 22 is used as the rear camera of the electronic device. Thus, there is no need to provide openings or holes for accommodating the cameras other than the opening 11 on the device body 1 of the electronic device.

The functional components provided in the overlapped manner are not limited to the camera 21 and the camera 22, and the present disclosure is not limited thereto. For example, the function components provided in the overlapped manner are respectively a camera and a flash lamp component. When the camera is used as the front camera, the flash lamp component provides momentary light for the rear camera of the electronic device. It is noted that the overlapping configuration between the functional components refers to that the projection of the functional components in z-axis direction are partially overlapped.

Figure 10:
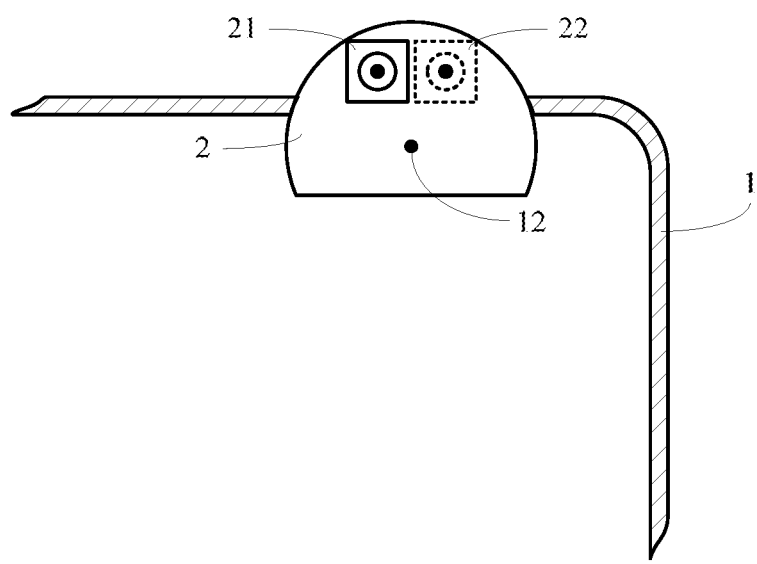
FIG. 10 illustrates a schematic structural diagram of another functional module having multiple functional components according to some embodiments.

FIG. 10 illustrates a functional module having multiple functional components according to some embodiments.

As shown in FIG. 10, when the functional module 2 includes a plurality of functional components, such as the camera 21 and the camera 22, the functional components may be non-overlapped with each other in z-axis direction. For example, the camera 21 is located on the left and the camera 22 is located on the right, and when the functional module 2 rotates around the rotating shaft 12, the camera 21 and the camera 22 correspond to different rotating angles. For example, the camera 21 may realize the shooting function when rotating counterclockwise by 135 degrees to 180 degrees, and the camera 22 may realize the shooting function when rotating clockwise by 135 degree to 180 degree.

As such, the camera 21 and the camera 22 may realize the shooting function independently or simultaneously by controlling the respective rotating angles. The camera 21 and the camera 22 may be located on the same side of the functional module 2. For example, both of the camera 21 and the camera 22 are front cameras or both of the camera 21 and the camera 22 are rear cameras, which may refer to the positional relationship between the camera 21 and the flash lamp component 23 shown in FIG. 11. It is noted that the non-overlapping between the functional components refers to that the projections of the functional components in the z-axis direction of the electronic device are not overlapped.

If the functional components are non-overlapped in the z-axis direction, the space occupied by the functional components can be reduced in the extending direction of the rotating shaft 12. For example, when the opening 11 is located at the surface of the device body 1 and the rotating shaft 12 extends in the z-axis direction of the electronic device, the non-overlapping between the functional components can reduce the space occupied by the functional module 2 in the z-axis direction. In this way, the thickness of the electronic device in the z-axis direction is reduced and thus a relatively thin electronic device may be realized.

The present disclosure does not limit that the non-overlapped functional components are cameras. For example, as shown in FIG. 11, the camera 21 and the flash component 23 may be non-overlapped, so that the flash lamp component 23 may provide momentary light for the camera 21.

Figure 11:
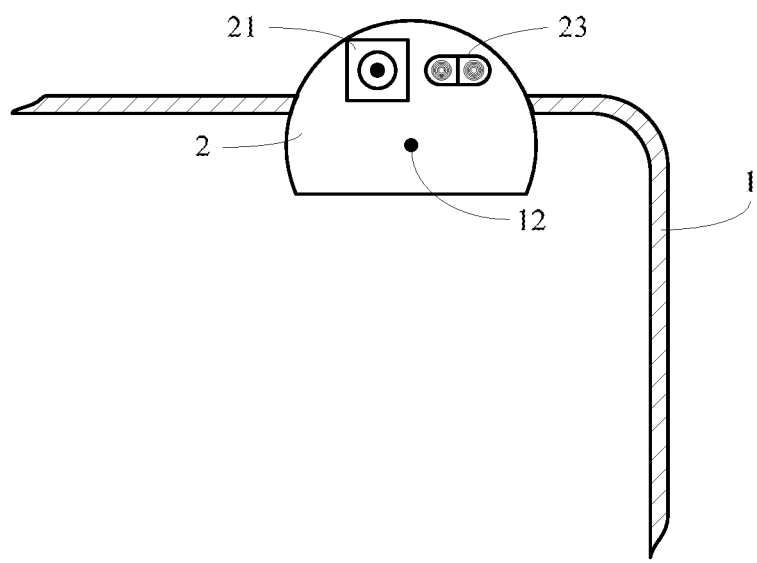
FIG. 11 illustrates a schematic structural diagram of yet another functional module having multiple functional components according to some embodiments.

Although the functional module 2 illustrated in FIGS. 9-11 each includes two functional components, more than two functional components can be provided in the functional modules 2 under the condition that the space of the functional module 2 is sufficient, and the present disclosure is not limited thereto. The positional relationship between a plurality of functional components may be an overlapping relationship as shown in FIG. 9, or a non-overlapping relationship as shown in FIGS. 10-11, or a partial overlapping relationship and a partial non-overlapping relationship, which are not limited in the present disclosure.

Figure 12:
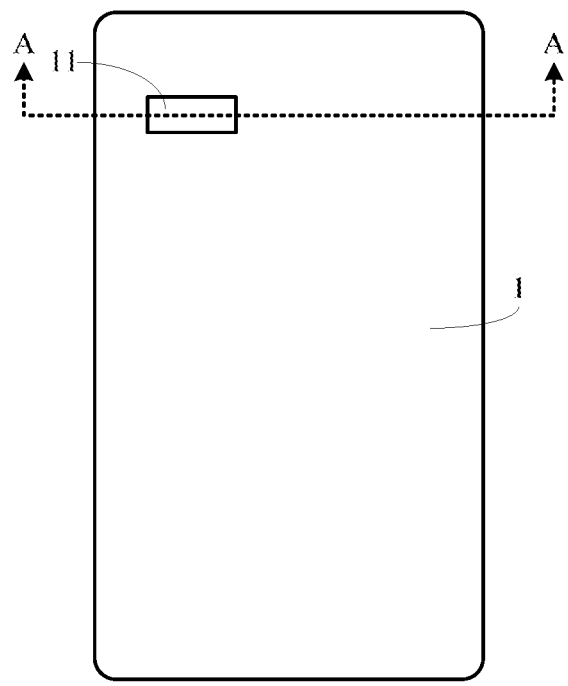
FIG. 12 illustrates a schematic diagram of an electronic device with an opening provided in a back surface according to some embodiments.

FIG. 12 provides an electronic device. As shown in FIG. 12, the opening 11 may be disposed on a back surface (may also be referred to as backplate) of the device body 1, and the functional module 2 may rotate into or out from the device body 1 through the opening 11.

Figure 13:
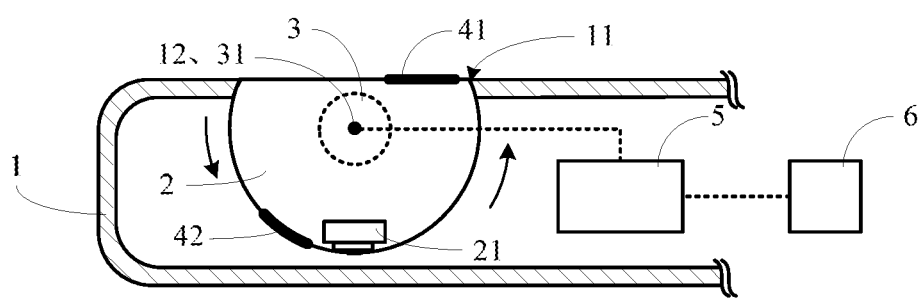
FIG. 13 illustrates a cross-sectional schematic view of the functional module in the direction A-A when the functional module rotates into the electronic device shown in FIG. 12.
Figure 14:
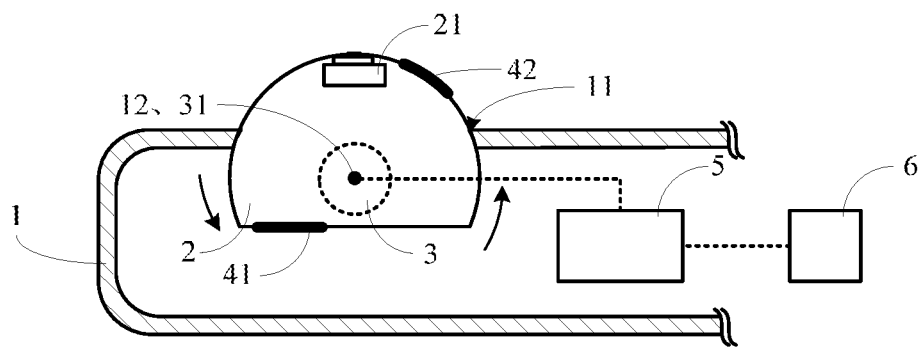
FIG. 14 illustrates a cross-sectional schematic view of the functional module in the direction A-A when the functional module rotates out from the electronic device shown in FIG. 12.

As shown in FIGS. 13-14, since the opening 11 is located on the back surface of the device body 1, the rotating shaft 12 extends in a direction perpendicular to the z-axis, for example, the y-axis direction. When the functional module 2 includes the camera 21, the camera 21 may be used as a rear camera. For example, when the functional module 2 rotates out from the device body 1, the state of the electronic device may be shown in FIG. 15, and the user may use the camera 21 to perform the rear shooting operation. In addition, any angle with respect to the rotating shaft 12 may be selected according to practical situations based on different types of functional components, and the present disclosure is not limited thereto.

In some embodiments, as shown in FIGS. 13-14, the functional component 2 may be driven by the driving module 3, which may refer to the example shown in FIG. 6, and details are not described here. The driving module 3 shown in FIG. 7 may also be applied to the examples shown in FIGS. 13-14, and details are not described here.

In some embodiments, as shown in FIGS. 13-14, the functional module 2 may be provided with touch sensing components 41, 42 to control the rotation of the functional module 2 according to a touch operation from the user, which may refer to the example shown in FIG. 6, and details are not described here.

In some embodiments, as shown in FIGS. 13-14, the functional module 2 may be controlled to rotate by a control module such as the CPU 5, which may refer to the example shown in FIG. 6, and details are not described here.

In some embodiments, as shown in FIGS. 13-14, the fall detection module such as the gravity sensor 6 may be used to perform fall protection control on the functional module 2, which may refer to the example shown in FIG. 6, and details are not described here.

Figure 15:
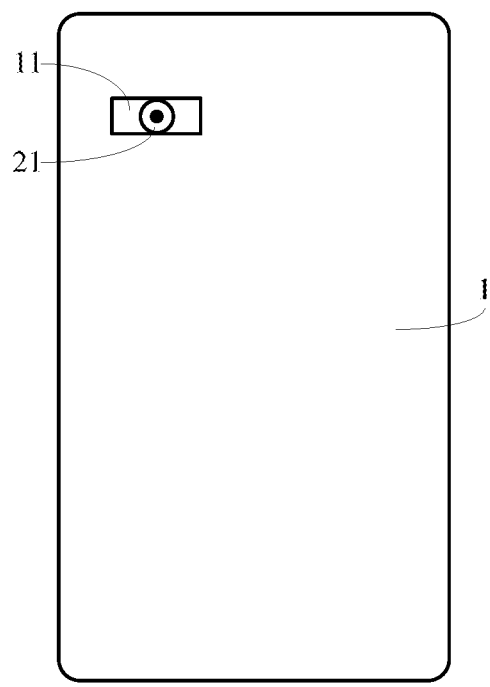
FIG. 15 illustrates a schematic diagram of the electronic device shown in FIG. 12 when the functional module is in a rotate-out state.
Figure 16:
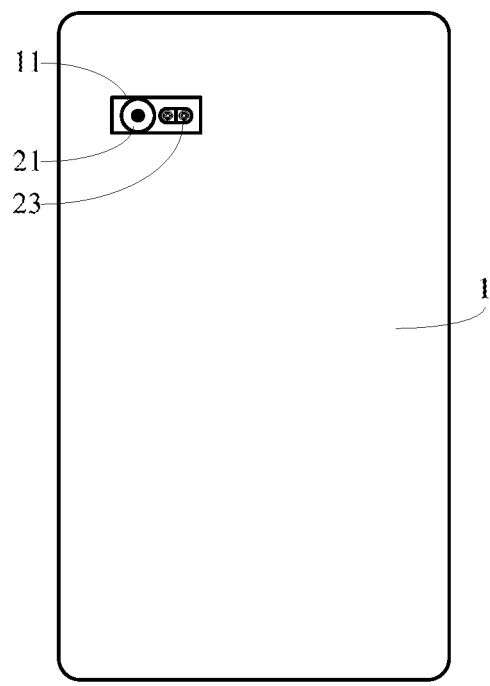
FIG. 16 illustrates a diagram of a functional module including a plurality of functional components in the electronic device shown in FIG. 12.

Although the functional module 2 only includes the camera 21 shown in FIGS. 13-15, the functional module 2 may actually include more functional components, which does not limit in the present disclosure. For example, as shown in FIG. 16, the functional module 2 may include a camera 21 and a flash lamp component 23. After the functional module 2 is rotated out from the device body 1, the camera 21 may perform rear-shooting operation, and the flash lamp component 23 may provide momentary light. The camera 21 may independently be used to photograph or the flash lamp component 23 may independently be used as a flashlight, which is not limited in the present disclosure.

In any of the above examples of the present disclosure, the electronic device may further include a seal for sealing a gap between the functional module 2 and the opening 11, thereby resisting water and dust to ensure that the electronic device can function properly. For example, the seal may be a rubber seal or the like, and the present disclosure is not limited thereto.

The electronic device of the present disclosure may include any type of mobile phone, tablet device, laptop computer, display screen, projector, and the like, and the present disclosure is not limited thereto.

In some embodiments, the screen may include a liquid crystal display (LCD) and a touch panel (TP). If the screen includes a touch panel, the screen may be implemented as a touch screen to receive input signals from the user. The touch panel includes one or a plurality of touch sensors to sense touches, slides, and gestures on the touch panel. The touch sensor may sense not only the boundary of the touches or sliding actions, but also the duration and pressure related to the touches or sliding operations. In some embodiments, the multimedia component 808 includes a front camera and/or a rear camera. When the terminal 800 is in an operation mode such as an image capturing mode or a video mode, the front camera and/or the rear camera may receive external multimedia data. Each front camera and rear camera may be a fixed optical lens system or have a focal length and an optical zoom capability.

In some embodiments, the display screen is an organic light-emitting diode (OLED) display screen, such as a rigid Active-matrix Organic Light-Emitting Diode (AMOLED) display screen, a flexible AMOLED display screen, or other types of displays.

To provide for interaction with a user, implementations of the subject matter described in this specification can be implemented with other types of devices as well, e.g., a virtual reality (VR)/augmented reality (AR) device, a head-mount display (HMD) device, a head-up display (HUD) device, smart eyewear (e.g., glasses), or any other monitor for displaying information to the user and a keyboard, a pointing device, e.g., a mouse, trackball, rocker switch etc., or a touch screen, touch pad, etc., by which the user can provide input to the apparatus.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

In the present disclosure, it is to be understood that the terms "center," "thickness," "front," "back," "left," "right," "top," "bottom," "outside," "clockwise," "counter clockwise," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, the terms "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

In the description of the present disclosure, the terms "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples.

In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Although particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An electronic device, comprising:
   a device body having a surface with an opening;
   a rotating shaft; and
   a functional module rotatable around the rotating shaft and configured to be able to rotate into the device body or rotate out from the device body through the opening;
   wherein the functional module comprises:
   a fixed portion; and
   a rotating portion;
   wherein the rotating portion comprises one or more functional components, the one or more functional components comprise a camera, and the rotating portion and the fixed portion are relatively rotatable to adjust an orientation of the camera in a direction different from a direction of rotation in and out from the device body through the opening.

2. The electronic device of claim 1, wherein the opening avoids ridge lines of the device body.

3. The electronic device of claim 1, wherein the device body has a front panel, a backplate, and at least one side surface, and wherein the opening is located in at least one of:
   the at least one side surface; or
   the backplate.

4. The electronic device of claim 1, wherein when the functional module rotates into the device body through the opening, a surface of the functional module is flush with the surface of the device body.

5. The electronic device of claim 1, wherein,
   the functional module is rotatable by 360 degrees around the rotating shaft.

6. The electronic device of claim 1, wherein,
   after the functional module is rotated out from the device body, the functional module is limited at a target position by an edge of the opening.

7. The electronic device of claim 1, wherein,
   when the opening is located on any surface of the device body except a front panel and a backplate opposing the front panel, a projection of the functional module in a thickness direction of the electronic device is a part of a circle,
   wherein the rotating shaft is located at a center of the circle and extends in the thickness direction.

8. The electronic device of claim 1, wherein,
   when the opening is located on any surface of the device body except a front panel and a backplate opposite to the front panel, a projection of the functional module in a thickness direction of the electronic device comprises a first projection area and a second projection area, wherein the first projection area is a part of a circle, the second projection area exceeds a coverage area of the circle, and the rotating shaft is located at a center of the circle and extends in the thickness direction.

9. The electronic device of claim 1, further comprising:
a driving module configured to drive the functional module to rotate around the rotating shaft.

10. The electronic device of claim 9, wherein the rotating shaft is at least one of:
a fixed shaft; or
a driving shaft formed by the driving module.

11. The electronic device of claim 9, further comprising:
a trigger detection module configured to detect a trigger operation and send a rotate-in command or a rotate-out command to the driving module when the trigger operation is detected.

12. The electronic device of claim 11, wherein the trigger detection module comprises at least one of:
a touch sensing component or a pressing sensing component in the functional module; and
a physical button or a touch component in the device body.

13. The electronic device of claim 9, further comprising:
a control module configured to send a rotate-in command or a rotate-out command to the driving module in response to a turn-off command or a call command for the functional module.

14. The electronic device of claim 9, further comprising:
a fall detection module configured to detect whether the device body is in a fall state and send a rotate-in command to the driving module when detecting that the device body is in the fall state.

15. The electronic device of claim 1, further comprising:
a seal configured to seal a gap between the functional module and the opening.

16. The electronic device of claim 1, wherein the functional module comprises at least one of:
a front camera component, a rear camera component, a flash lamp component, a 3D structured light component, an earphone component, or a loudspeaker component.

17. The electronic device of claim 1, wherein the functional module comprises a plurality of functional components, wherein projections of at least some of the functional components in a thickness direction of the electronic device are overlapped.

18. The electronic device of claim 1, wherein the functional module comprises a plurality of functional components, wherein projections of the functional components in a thickness direction of the electronic device are non-overlapped.

19. The electronic device of claim 1, wherein
the rotating portion is configured to rotate relative to the fixing portion to adjust the orientation of the camera in the direction perpendicular to the direction of rotation in and out of the device body.

20. The electronic device of claim 1, wherein when the functional module rotates into the device body, the functional module protrudes from or is recessed in the device body.

* * * * *